United States Patent
Loh et al.

(10) Patent No.: US 10,671,722 B2
(45) Date of Patent: Jun. 2, 2020

(54) MECHANISM FOR THROTTLING UNTRUSTED INTERCONNECT AGENTS

(71) Applicant: Advanced Micro Devices, Inc., Sunnyvale, CA (US)

(72) Inventors: Gabriel H Loh, Bellevue, WA (US); Maurice B Steinman, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 279 days.

(21) Appl. No.: 15/230,388

(22) Filed: Aug. 6, 2016

(65) Prior Publication Data
US 2018/0039777 A1  Feb. 8, 2018

(51) Int. Cl.
    *G06F 21/55* (2013.01)
    *H04L 29/06* (2006.01)
    *G06F 21/71* (2013.01)

(52) U.S. Cl.
    CPC ............ *G06F 21/55* (2013.01); *G06F 21/554* (2013.01); *G06F 21/71* (2013.01); *H04L 63/1458* (2013.01)

(58) Field of Classification Search
    CPC .......... H04L 63/14; H04L 63/16; G06F 21/55
    See application file for complete search history.

(56) References Cited

U.S. PATENT DOCUMENTS

| 2005/0018618 A1* | 1/2005 | Mualem ............ H04L 63/1458 370/252 |
| 2014/0254388 A1* | 9/2014 | Kumar ............... H04L 47/2425 370/238 |
| 2014/0379895 A1 | 12/2014 | Jain |
| 2016/0078347 A1 | 3/2016 | Salajegheh et al. |

OTHER PUBLICATIONS

Alfaraj, Najla, et al. "Hope: Hotspot congestion control for clos network on chip." Networks on Chip (NoCS), 2011 Fifth IEEE/ACM International Symposium on. IEEE, 2011.
International Search Report, Application No. PCT/US2017/039999 dated Sep. 29, 2016.

* cited by examiner

*Primary Examiner* — Izunna Okeke
(74) *Attorney, Agent, or Firm* — Liang & Cheng, PC (57) ABSTRACT

A host system-on-chip (SoC) includes a network on chip (NoC) for transmitting local traffic between internal blocks of the SoC, an external processor link for receiving messages at the host SoC from an untrusted device. A traffic controller in the host SoC that is coupled with the external processor link monitors an amount of external traffic from the untrusted device over a set of one or more time intervals, detects a violation of a traffic policy based on the amount of external traffic, and in response to detecting the violation, reduces traffic in the NoC resulting from the messages from the untrusted device.

19 Claims, 5 Drawing Sheets

MECHANISM FOR THROTTLING UNTRUSTED INTERCONNECT AGENTS

BACKGROUND

Some modern computer systems utilize multiple processing units, such as central processing units (CPUs), graphics processing units (GPUs), or other systems on a chip (SoCs), that are able to communicate with each other through a communication interface, such as HyperTransport (HT). As an example, HT is a high-bandwidth bidirectional serial/parallel bus that allows the multiple processors to communicate in point-to-point fashion with each other, or with other devices.

However, in such systems, uncooperative behavior of one or more of the SoCs or other devices in the system (whether resulting from poor design, bugs, or malicious intent) could negatively impact performance of cooperating SoCs or devices. For example, such devices could cause denial-of-service (DOS) attacks and other problems if they are allowed to issue excessive memory requests or other traffic into other SoCs through the external interface (e.g., HT) without any constraints.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

In one embodiment, a host processor or other system-on-chip (SoC) in a computing system includes an external interface such as HyperTransport (HT) to enable communication with other SoCs, devices, and modules in the computing system. However, the behavior of these external devices often cannot be guaranteed, particularly when they are provided by a third-party. Thus, when cooperation of the external devices cannot be assured, the host SoC may treat these devices as untrusted agents to prevent performance degradation, denial-of-service (DOS) attacks, and other problems that may arise if the untrusted devices or software running on the untrusted devices are allowed to perform certain actions without any constraints. For example, an external device that issues an excessive number of memory requests into the host SoC through the external interface could overburden the network-on-chip (NoC) of the host SoC, thus effecting a DOS situation that restricts local traffic between internal blocks of the host SoC from being serviced.

In one embodiment, an external processor link interface implements a flow-control mechanism (e.g., credit-based flow control); however, such a mechanism only ensures that local hardware structures and resources (e.g., buffers) do not get over-subscribed or overflow. For a credit-based flow control mechanism, once the requests have moved onward in the network, the credits are released and more requests can be sent. While such a flow-control mechanism ensures that short-term bursts of traffic do not overwhelm the hardware resources, it does not necessarily provide for long-term management of total traffic.

In one embodiment, a host SoC also implements a traffic controller mechanism that monitors traffic from the untrusted external device and throttles traffic from the external device upon detecting that the amount of external traffic from the external device (as measured by the number of messages, bytes, etc.) violates a traffic policy. In one embodiment, the traffic controller counts the number of messages or bytes from the untrusted device over a set of one or more time intervals to determine whether the amount of traffic from the untrusted device violates the policy. If so, then the traffic controller restricts the amount of traffic that is accepted from the untrusted device for a number of subsequent time intervals.

Figure 1:
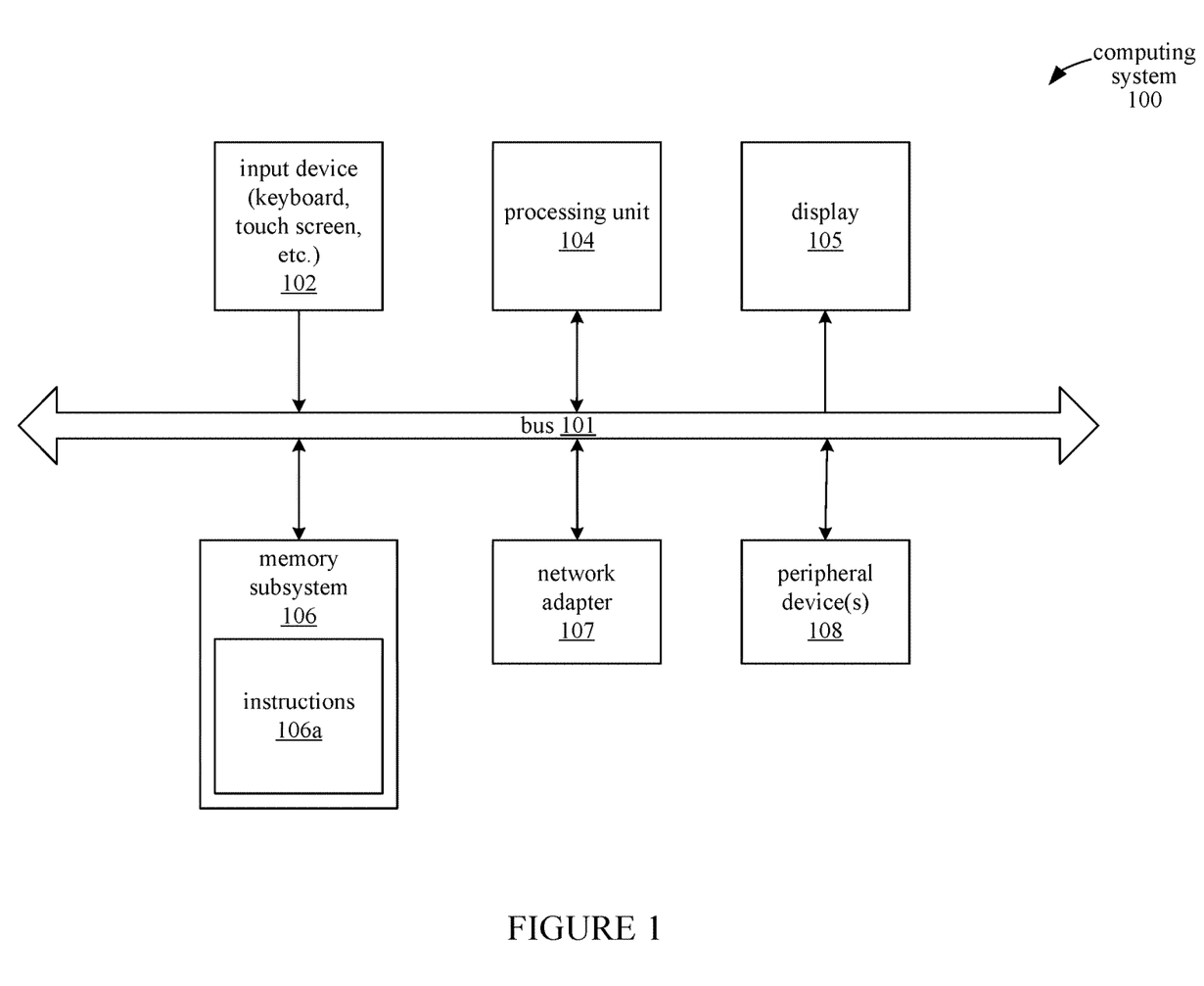
FIG. 1 illustrates an embodiment of a computing system.

FIG. 1 illustrates an embodiment of a computing system 100 which implements a traffic control mechanism for untrusted devices, as described above. In general, the computing system 100 may be embodied as any of a number of different types of devices, including but not limited to a laptop or desktop computer, mobile phone, server, etc. The computing system 100 includes a number of components 102-108 that communicate with each other through a bus 101. In computing system 100, each of the components 102-108 is capable of communicating with any of the other components 102-108 either directly through the bus 101, or via one or more of the other components 102-108. The components 101-108 in computing system 100 are contained within a single physical casing, such as a laptop or desktop chassis, or a mobile phone casing. In alternative embodiments, some of the components of computing system 100 may be embodied as peripheral devices such that the entire computing system 100 does not reside within a single physical casing.

The computing system 100 also includes user interface devices for receiving information from or providing information to a user. Specifically, the computing system 100 includes an input device 102, such as a keyboard, mouse, touch-screen, or other device for receiving information from the user. The computing system 100 displays information to the user via a display 105, such as a monitor, light-emitting diode (LED) display, liquid crystal display, or other output device.

Computing system 100 additionally includes a network adapter 107 for transmitting and receiving data over a wired or wireless network. Computing system 100 also includes one or more peripheral devices 108. The peripheral devices 108 may include mass storage devices, location detection devices, sensors, input devices, or other types of devices that are used by the computing system 100.

Computing system 100 includes a processing unit 104 that is configured to receive and execute instructions 106a that are stored in the memory subsystem 106. In one embodiment, the processing unit 104 includes multiple processing elements, where each processing element may be a graphics processing unit (GPU), an accelerated processing unit (APU), a field programmable gate array (FPGA), a digital signal processor (DSP), or any other application-specific integrated circuit (ASIC) or SoC.

Memory subsystem 106 includes memory devices used by the computing system 100, such as random-access memory (RAM) modules, read-only memory (ROM) modules, hard disks, and other non-transitory computer-readable media. The memory included in memory subsystem 106 is used as main memory in the computing system 100. Additional types of memory can be included in memory subsystem 106 or elsewhere in computing system 100. For example, cache memory and registers may also be present in the processing unit 104 or on other components of the computing system 100.

Figure 2:
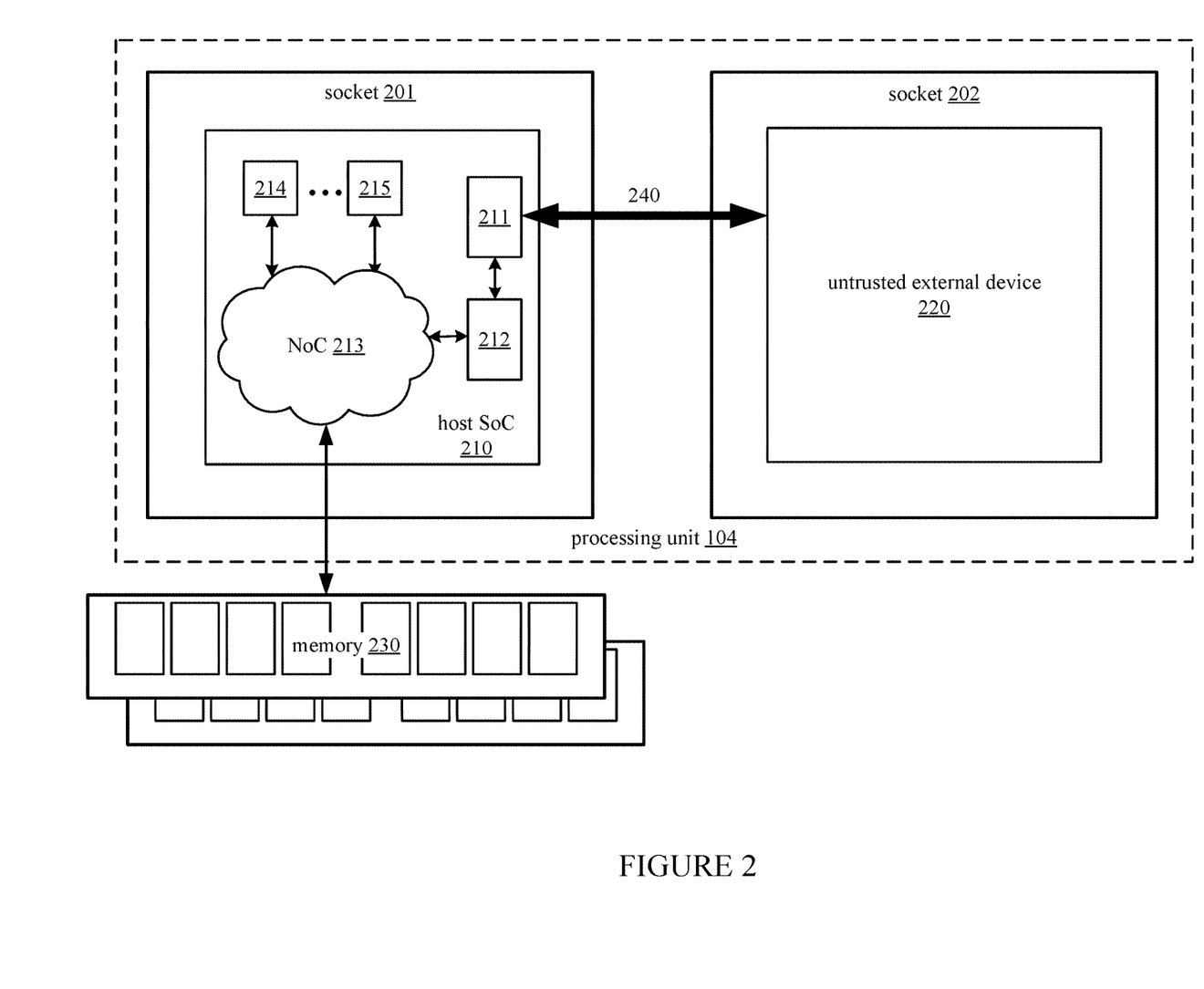
FIG. 2 illustrates a portion of a computing system including a processing unit and memory, according to an embodiment.

FIG. 2 illustrates an embodiment of a processing unit 104 implemented as a two-socket system, along with a memory 230 that is included in memory subsystem 106. In the processing unit 104, each of the sockets 201 and 202 contains a SoC (e.g., a multi-core chip, an APU, etc.) and are connected to each other through an external processor link 240. In one embodiment, the interface for implementing the external processor link 240 could be an open standard such as HyperTransport, a proprietary interface such as QuickPath Interconnect (QPI), or some other similar interface.

When both sockets 201 and 202 contain SoCs from the same designer, the SoCs may be designed to cooperate with each other in sharing the bandwidth of the link 240 fairly. However, in one embodiment, the two-socket system connects a host SoC 210 with an untrusted external device 220 from a different designer. Accordingly, cooperative behavior of device 220 with respect to fair consumption of the available bandwidth may not be guaranteed. However, the untrusted device 220 is still able to issue memory requests (e.g., memory read and write requests) and other messages or transactions (e.g., memory translation requests) across the link 240.

In one embodiment, the host SoC 210 is connected to a memory 230. Memory 230 is part of the memory subsystem 106. In some embodiments, memory 230 may represent memory in a peripheral device, such as an input device or communication device. Memory 230 is accessed by the external device 220 via memory requests and other messages transmitted through the host SoC 210 that are directed to the memory 230. For example, the external device 220 issues memory requests to the host SoC 210 to cause the host SoC 210 to read from or write to the memory 230. For a read request from the external device 220, the host SoC 210 responds to the read request by returning the data read from the memory 230 to the external device 220. The external device 220 also uses the same pathway to perform memory translation requests for the memory 230, where the host SoC 210 responds to the memory translation request by returning a translated memory address to the external device.

These communications between the external device 220 and the host SoC 210 are transmitted through the external processor link 240, which is implemented using HT, QPI, or other technology. The external processor link also includes flow control logic 211 for regulating traffic from the external device 220. In one embodiment, the host SoC 210 includes input buffers or other hardware resources for managing incoming messages from the external device 220; thus, the flow control logic 211 regulates the message traffic from the external device 220 based on the capacity of the input buffers and other hardware resources to prevent the external device 220 from exceeding the capacity of these hardware resources. In one embodiment, the flow control logic 211 implements a credit-based flow control mechanism that transmits credits to the external device 220 indicating the number of available input buffers at the host SoC 210. The external device 220 then sends a number of messages corresponding to the number of received credits.

The host SoC 210 includes a network-on-chip (NoC) 213, which is an on-chip interconnect used to transmit local traffic between internal blocks (e.g., block 214 and 215) of the host SoC 210. The NoC 213 also carries messages (e.g., memory requests) from the external device 220 that are directed to the memory 230 and data from the memory 230 that is being returned to the external device 220. For example, a message from the external device 220 that is directed to the memory 230 is transmitted through the external processor link 240, the flow control logic 211, traffic controller 212, and NoC 213 before it is received at the memory 230. Data from the memory 230 (e.g., data read in response to a read request) returns to the external device 220 through the same path.

Thus, if the external device 220 issues too many memory requests, the NoC 213 can become congested. As a result, local traffic from the internal blocks (e.g., blocks 214-215) of the host SoC 210 could experience performance degradations due to the congestion in the NoC 213 and/or due to queuing delays at the memory 230.

Thus, one embodiment may include the traffic controller 212 on the same integrated circuit chip as the host SoC 210. The traffic controller 212 is connected to the external processor link 240 and performs several functions, including monitoring the number of messages or bytes received from the untrusted external device 220 over a set of one or more time intervals, detecting a violation of a traffic policy based on the number of messages, and reducing traffic in the NoC 213 resulting from the messages from the untrusted device 220 when the traffic policy has been violated.

Figure 3:
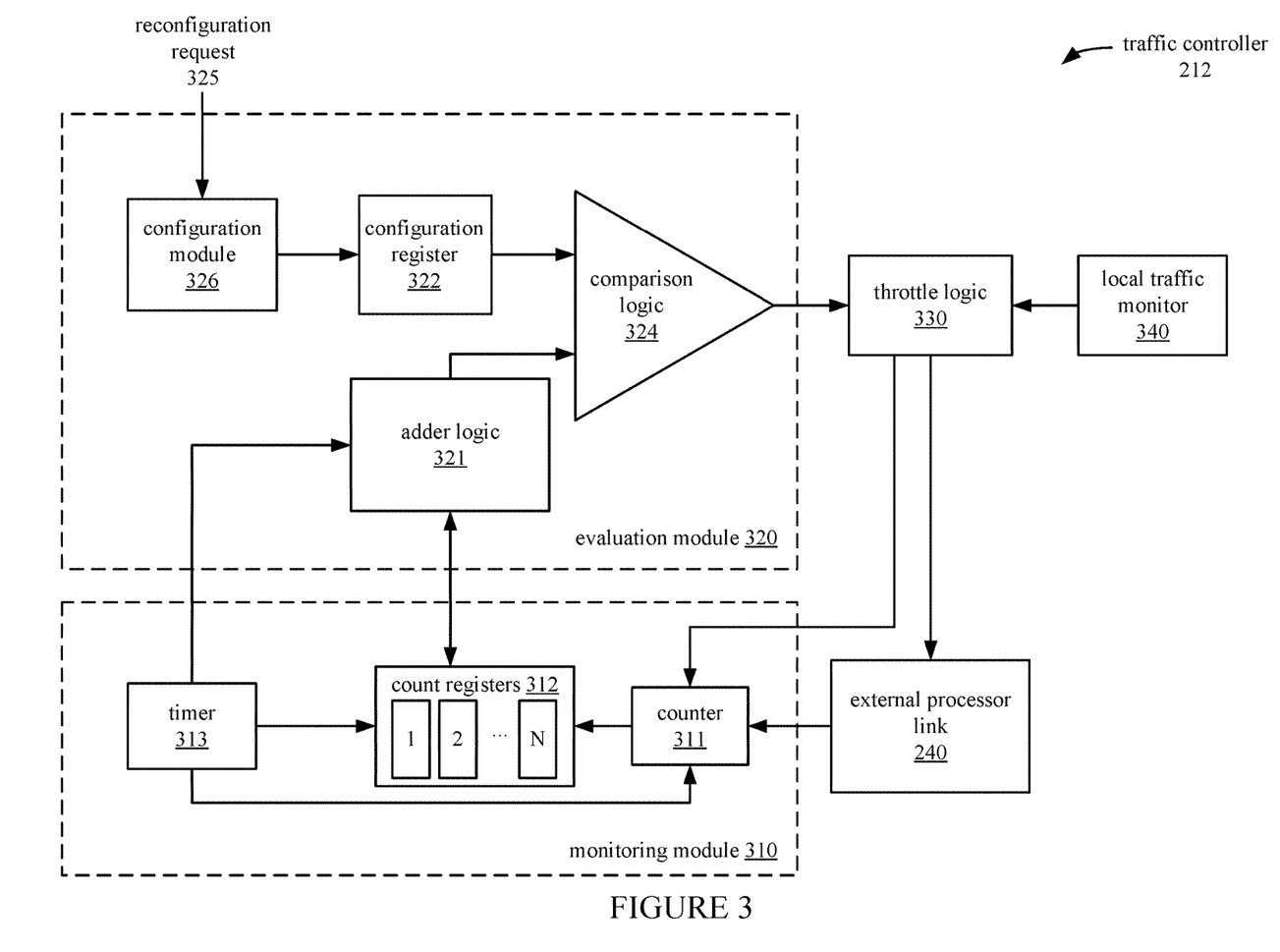
FIG. 3 illustrates an embodiment of a traffic controller module.

FIG. 3 illustrates one embodiment of a traffic controller 212. The traffic controller 212 includes monitoring module 310 for dynamically monitoring the traffic to and from the external device 220 via external processor link 240, evaluation module 320 for determining whether the observed traffic violates a pre-defined traffic policy, and throttle logic 330 for throttling or otherwise reducing the undesirable effects caused by excess traffic originating from the external device 220.

By the operation of the modules 310, 320, and 330, the traffic controller 212 detects the violation of the predetermined traffic policy by determining whether a number of messages (or bytes) transmitted to the host SoC 210 from the untrusted external device 220 exceeds a maximum threshold for each of a number of successive time intervals.

The monitoring module 310 monitors traffic to and from the external device 220 across the external processor link 240. In one embodiment, the monitoring module 310 counts the number of messages sent by the external device 220; alternatively, the monitoring module 310 may track some other metric, such as the number of bytes sent. Accordingly, the counter 311 counts the number of messages or bytes sent by the external device 220 over the external processor link 240 for each of the successive time intervals.

The monitoring module 310 includes a timer 313 for defining the time intervals. At the beginning of each interval, the timer 313 resets the counter 311 to zero. As the time interval elapses, the counter 311 monitors the total traffic to and from the external device 220; for example, the counter 311 may increment for each message that is received from the external device at the external processor link 240. In an alternative embodiment, the counter 311 may increment for messages both transmitted to and received from the external device.

The count registers 312 (including registers 312-1, 312-2 . . . 312-N) are shift registers that are logically operated as a circular shift buffer, with each register used to store a count value for one of the time intervals. Thus, when the timer 313 indicates that the time interval has elapsed, the count value in counter 311, which indicates the number of messages or bytes observed for the current time interval, is stored in a currently selected one of the count registers 312.

After the current count value is stored in the currently selected register (e.g., register 312-1), the timer 313 selects the next register (e.g., register 312-2) in the set of count registers 312. After the last register 312-N is selected, elapsing of the time interval causes the first register 312-1 to be selected again and overwritten. Thus, the each of the count registers 312 stores a count value for one of the set of N most recent time intervals.

The evaluation module 320 includes adder logic 321, which calculates a sum, average, or other metric based on the count values in the registers 312. The output of adder logic 321 is then compared with a threshold for the corresponding time interval. In one embodiment, the adder logic 321 may simply select one of the registers 312 (e.g., the register corresponding to the most recently elapsed time interval) to compare with a threshold for that interval.

Alternatively, the adder logic 321 may be configured to calculate an average number of messages from the untrusted external device 220 over a sliding window of the N most recent time intervals. For example, the adder logic 321 may be triggered by the timer 313 to calculate such a time-based moving average upon the expiration of each of the successive time intervals. Thus, for each time interval, the adder logic 321 calculates an average of the N count values currently stored in the registers 312. For implementations where N is a power of two, computing the average is simple, since division by N is efficiently accomplished by simply dropping the $\log_2(N)$ least significant bits of the sum of the registers.

In some scenarios, the distant past is less important than more recent behavior; accordingly, count values measured for older time intervals are weighted to reduce their inputs to the overall sum. In one configuration, the adder logic 321 calculates a time-weighted average of the count values in registers 312. If the N most recent count values are represented as $x_0, x_1 \ldots x_{N-1}$, then an unweighted moving average can be expressed as:

$$(\Sigma_{i=0}^{N-1} x_i)/N \quad \text{(Equation 1)}$$

An exponentially weighted moving average is expressed by the following equation, where α is a value greater than zero and less than one:

$$(\Sigma_{i=0}^{N-1} \alpha^i \times x_i)/N \quad \text{(Equation 2)}$$

Figure 4:
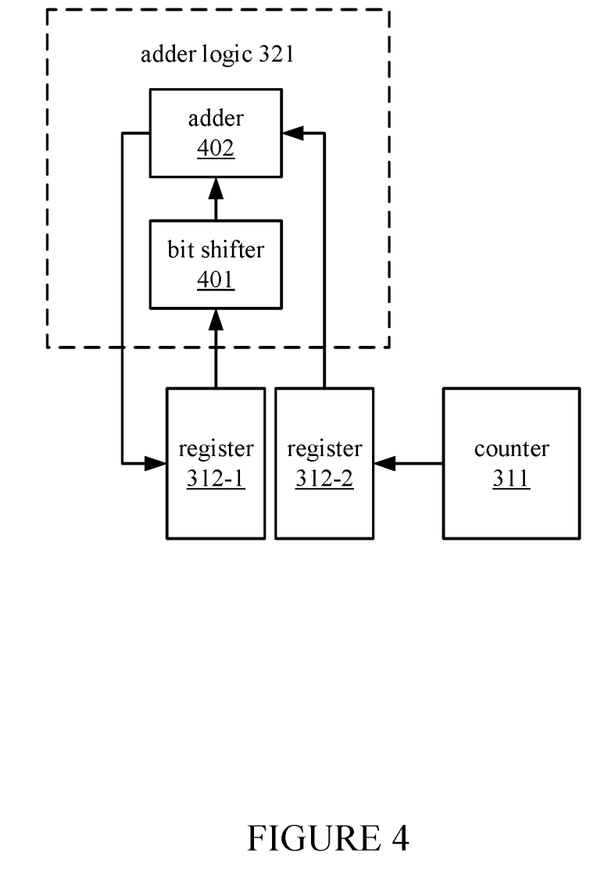
FIG. 4 illustrates logic for implementing a time-weighted average of traffic count values, according to an embodiment.

In cases where α is a power of two (e.g., ½), the hardware overhead can be reduced from N registers to just two registers. FIG. 4 illustrates the adder logic 321 and two registers 312-1 and 312-2 implementing a time-weighted average where α=½, according to an embodiment. Register 312-1 stores the time-weighted sum of N−1 prior intervals and register 312-2 stores the count value for the most recent (Nth) time interval, as determined by counter 311. At the end of the current time interval, the value in register 312-1 is divided by 2 by the bit shifter 401 and added (via adder 402) to the count value from register 312-2. The new time-weighted sum from adder 402 is stored back into register 312-1. Register 312-2 is then reset to zero to begin counting for the next interval. A new time-weighted average is then calculated by dividing the new time-weighted sum in register 312-1 by N.

Referring back to FIG. 3, the evaluation module 320 includes comparison logic 324 having an input connected to configuration register 322, which stores a maximum threshold for each of the N time intervals. In an alternative embodiment, the configuration register 322 stores one threshold for all of the N time intervals.

The maximum threshold for a given time interval indicates a maximum number of messages or a maximum number of bytes that can be received from the untrusted external device 220 across the external processor link 240 during the time interval without violating the traffic policy. In alternative embodiments, the maximum threshold also applies to the number of messages or bytes transmitted to the external device 220 from the host SoC 210, or may apply to the number of messages or bytes both transmitted to and received from the external device 220.

In the traffic controller 212, the maximum thresholds are programmable by software (e.g., set by firmware, or specified by an operating system executing on the computing system 100). In an alternative embodiment, the thresholds may be programmed at manufacture time, or may be a hard-wired value. The thresholds in the configuration register 322 are programmable via a configuration module 326, which includes configuration logic for configuring the values stored in the register 322. The configuration module 326 stores one or more new thresholds in the configuration register 322 in response to receiving a reconfiguration request 325 that indicates the one or more new maximum thresholds.

The reconfiguration request 325 is issued by the host SoC 210, or may alternatively be issued by an external device or process, such as another SoC in the computing system 100 or a process being executed on another SoC. In one embodiment, the thresholds are programmable only by trusted devices or software. Accordingly, the configuration module 326 authenticates the request 325 to ensure that the request 325 is from a trusted entity, and only updates the configuration register 322 in response to a successful authentication. Accordingly, the configuration module 326 discards or ignores the request 325 in response to failing to authenticate the request 325.

Examples of trusted software include the firmware, the operating system, or other software cryptographically signed and authenticated by other trusted systems. In one embodiment, other parameters of the traffic controller 212, such as the duration of the time intervals, are also configured by a similar request and authentication mechanism.

The comparison logic 324 compares the output of the adder logic 321 (representing a sum, average, time-weighted average, or other metric calculated from registers 312) with a maximum threshold corresponding to the most recently completed time interval, as provided by the configuration register 322. The comparison logic 324 asserts its output if the adder logic 321 output exceeds the maximum threshold.

The output of the comparison logic 324 is connected to the throttle logic 330. In one embodiment, the output of comparison logic 324 indicates to the throttle logic 330 the number of messages or bytes by which the threshold is exceeded. When the output of the comparison logic 324 thus indicates a violation of the traffic policy caused by excessive traffic to and/or from the untrusted external device 220, the throttle logic 330 restricts traffic to and/or from the external device 220 for a predetermined time period.

One method for restricting traffic of the external device 220 is to throttle the traffic from the external device 220 to a predefined low level, thus allowing only a few messages from the external device 220 to access the NoC 213. This enables the external device 220 to continue making forward progress, but its ability to use the external processor link 220 interface to/from the host SoC is reduced. The exact level of throttling is also configurable by an authenticated reconfiguration request from a trusted device or software.

In some embodiments, the throttle level can be set so that no messages are sent to or received from the external device 220 until the current interval elapses. In particular, this method can be used when the traffic controller 212 is using a relatively short interval length, in order to avoid long-term starvation of the external device. In one embodiment where a credit-based flow-control mechanism is used, the host SoC 210 throttles the traffic from the external device 220 by restricting the number of credits returned to the external device 220 until the current time interval has elapsed.

In one embodiment, the external device 220 is not merely throttled for the remainder of the current interval, but is instead throttled for the next M intervals. In one embodiment, the throttle level is progressively relaxed and becomes less restrictive over the M intervals, allowing the traffic from the external device 220 to eventually return to its normal unrestricted level. Similar to other parameters, the value of M and the rate of relaxation are configurable by an authenticated reconfiguration request from a trusted device or process.

In one embodiment, the throttle logic 330 throttles the traffic from the external device 220 by reducing the maximum threshold for the next subsequent time interval by an amount corresponding to a difference between the count value and the maximum threshold for the current time interval. In one embodiment, the throttle logic 330 decrements the threshold corresponding to the next time interval by the calculated difference. Alternatively, another method for achieving the same effect is by, at the end of the current time interval, decrementing the counter 311 by the threshold amount instead of resetting the counter to zero. For example, a threshold amount of 10 is exceeded by a count value of 12, resulting in a violation. Thus, the count value of 12 is decremented by the threshold amount of 10, leaving an initial count value of 2 for the next interval. In the next interval, the external device 220 can send 8 more messages before the threshold is exceeded.

In practice, an external device 220 that exceeds the traffic threshold will more quickly reach the threshold in the next interval because its counter starts at a value greater than zero. Thus, a violation of the traffic policy in the current time interval effectively results in a decrease in the threshold for the next subsequent time interval, so that the external device is able to "borrow" traffic credit from the next interval. The debt is then repaid at the beginning of the next interval.

In one embodiment, the traffic controller 212 allows the external device 220 to continue communicating with the host SoC 210 even after violating the traffic policy, but counts the amount of traffic (in number of messages, bytes, etc.) that has been accepted after the threshold has been reached. This amount that exceeds the threshold is recorded as a debt that the external device repays over the course of subsequent time intervals.

When the NoC 213 or the memory 230 become congested during the subsequent time intervals, the traffic controller 212 throttles traffic from the external device 220. For each time interval in which a message from the external device 220 is delayed by the host SoC 210 due to throttling, the debt of the external device 220 is reduced by a configurable amount R.

The traffic controller 212 also implements time-based debt forgiveness to prevent an external device 220 from going into irrecoverable debt. In one embodiment, the traffic controller 212 reduces the current debt by a factor $\beta$ for every C time intervals. For example, where $\beta$ is 0.5 and C is 10, the debt would be halved every tenth interval.

In addition to monitoring the traffic across the external processor link 240 interface to and from the external device 220, the traffic controller 212 also includes a local traffic monitor 340 that monitors the traffic level in the NoC 213 due to local traffic. The monitored local traffic includes traffic between internal blocks (e.g., internal blocks 214 and 215) of the host SoC 210, traffic from compute units (e.g., central processing units or graphics processing units) of the host SoC 210 into the NoC 213, traffic to or from the memory system of the host SoC 210, or other local traffic metrics.

The local traffic monitor 340 provides information about the local traffic level to the throttle logic 330 so that the throttle logic 330 is able to avoid unnecessarily throttling traffic from the external device 220 during times when the NoC 213 has sufficient bandwidth to service local traffic and traffic from the external device 220. For example, if the host SoC 210 is largely idle (e.g., it has off-loaded work to the external device 220), then this mechanism allows the external device 220 to inject traffic back to the host SoC 210 at the highest possible rate to allow the external device 220 to maximize its performance.

In other words, if the local traffic demand of the host SoC 210 is sufficiently low, then the traffic controller 212 allows the external device 220 to continue issuing requests at a high rate even if the external device 220 has otherwise exceeded the normal per-interval (or moving average) threshold.

In one embodiment, the local traffic monitor 340 includes one or more counters for counting the number of messages and/or bytes transmitted over the NoC 213 that originate from the host SoC 210 for each time interval. Based on these local traffic count values, the local traffic monitor 340 then determines whether the local traffic in the NoC 213 exceeds a local traffic threshold. When the local traffic exceeds the local traffic threshold, the local traffic monitor enables the throttle logic 330 to reduce traffic due to the external device 220 when the external device 220 violates traffic policy.

As described above, the traffic controller 212 regulates traffic to and from an external device 220 that is implemented in a separate integrated circuit package from the host SoC 210. In alternative embodiments, the mechanisms implemented in the traffic controller 212 are used to regulate traffic to and from untrusted blocks within the same integrated circuit package as a host system. For example, some SoC designs incorporate untrusted blocks from third-party designers, where cooperative behavior of such blocks cannot be guaranteed.

In such cases, the same monitoring and throttling mechanisms implemented by the traffic controller 212 are applied to an on-chip interconnect connecting the untrusted internal block to the NoC 213 to ensure that the untrusted block does not cause performance problems (such as DOS-like behavior) resulting from excessive messaging.

In alternative embodiments, multiple chips are packaged together using multi-chip module (MCM) technology and/or silicon interposer-based integration (2.5D stacking), where one or more chips may be supplied from a third party designer. Such packaging will provide some form of interconnect between the chips (e.g., HT, Advanced eXtensible Interface (AXI), etc.) upon which the traffic control mechanisms of the traffic controller 212 are applied.

Figure 5:
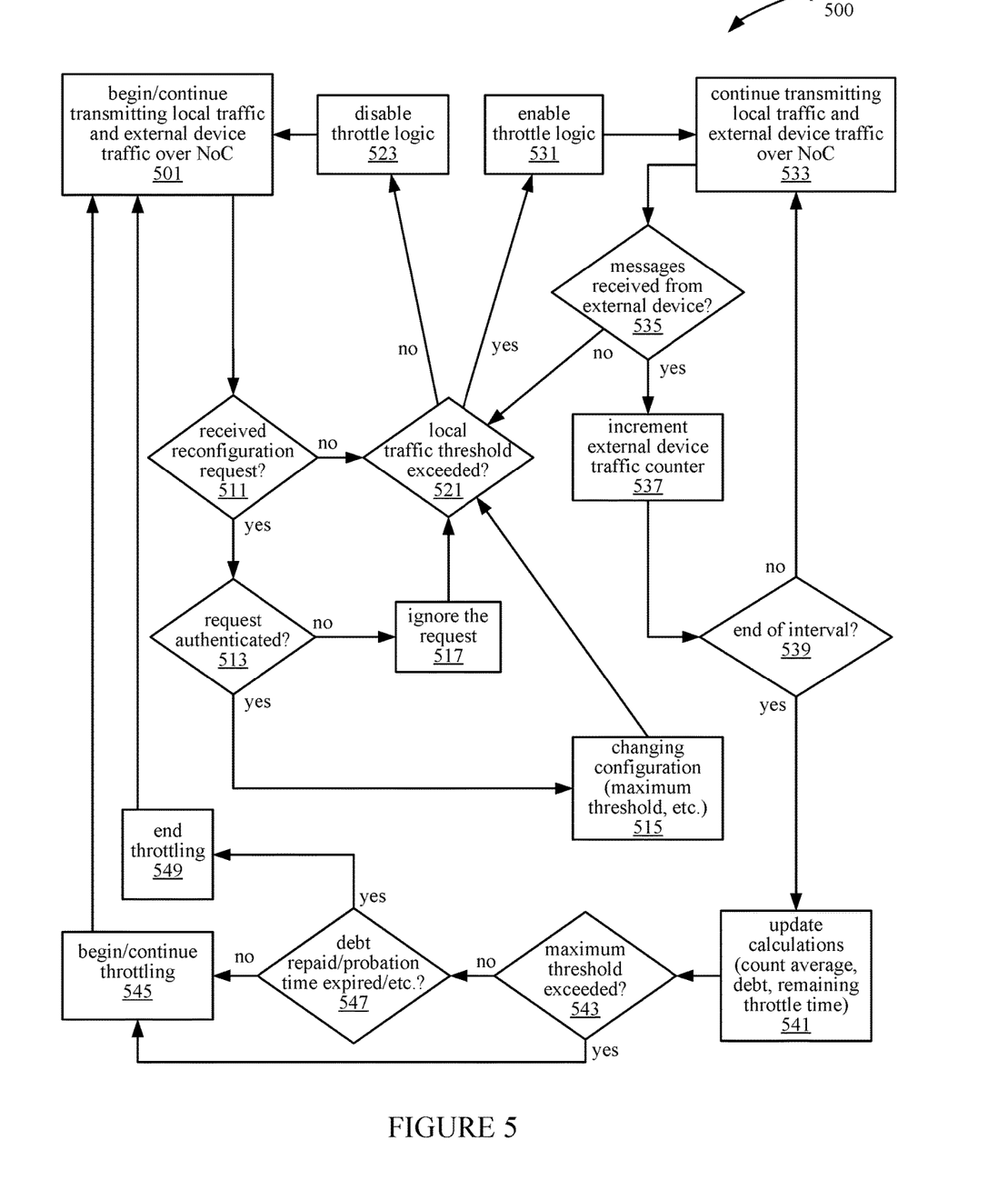
FIG. 5 is a flow diagram illustrating a process for throttling traffic from an untrusted external device, according to an embodiment.

FIG. 5 is a flow diagram illustrating a process 500 for throttling traffic from an untrusted external device, according to an embodiment. The operations of process 500 are performed by the traffic controller 212 and other components of the computing system 100.

The process 500 begins at block 501. At block 501, internal blocks (e.g., blocks 214 and 215) of the host SoC 210 communicate with each other by transmitting local traffic to each other over the NoC 213. The NoC 213 is also used to carry messages between the external device 220 and the memory 230, or between the external device 220 and the internal blocks of the host SoC 210. From block 501, the process 500 continues at block 511.

At block 511, the traffic controller 212 determines whether a reconfiguration request 325 has been received at the configuration module 326. The reconfiguration request 325 originates from the host SoC 210, an external device connected to the host SoC 210, or some other device or process. The reconfiguration request 325 specifies new values for one or more operating parameters of the traffic controller 212, such as a local traffic threshold, a maximum traffic threshold for the external device 220, a number of intervals M for throttling the external device 220 after a traffic policy violation, etc. The reconfiguration request 325 is also used to select the throttling method (e.g., throttling for M intervals, debt accrual and payback, etc.) implemented by the traffic controller 212.

At block 513, the configuration module 326 authenticates the reconfiguration request 325 to determine whether the request 325 originated from a trusted device that is permitted to reconfigure the traffic controller 212. If the authentication is successful, the configuration module 326 changes the configuration according to the request 325 (block 515). For example, when the configuration module 326 successfully authenticates a reconfiguration request 325 that requests a change in the maximum threshold for traffic from the external device 220, the configuration module 326 updates the threshold value stored in register 322 with the new value indicated in the request 325 after successfully authenticating the request 325. At block 513, if the reconfiguration request 325 is not successfully authenticated, the configuration module 326 ignores the request 517 and does not update the register 322. From block 515 or block 517, the process 500 continues at block 521.

At block 521, the local traffic monitor 340 determines whether the local traffic (i.e., traffic between internal blocks of the host SoC 210) in the NoC 213 exceeds a local traffic threshold. The local traffic monitor counts the number of local messages or, alternatively, the number of bytes transmitted; if this count value does not exceed the local traffic threshold, the throttle logic is disabled at block 523. Since the local traffic demand is low, the NoC 213 has sufficient bandwidth to service traffic from the external device 220 without having to monitor and potentially throttle excess traffic from the external device 220. Thus, the transmission of messages from the external device 220 over the NoC 213 continues at block 501 with throttling disabled.

At block 521, if the local traffic count value exceeds the local traffic threshold, the local traffic monitor 340 enables the throttle logic 330 at block 531. At block 533, the transmission of local traffic and traffic from the external device 220 continues with the throttle logic 330 enabled. With the throttle logic 330 enabled, traffic controller 212 monitors traffic from the external device 220 and reduces the amount of traffic in the NoC 213 due to the external device 220 in response to detecting a violation of the traffic policy. From block 533, the process 500 continues at block 535.

At block 535, if no messages have been received at the host SoC 210 from the external device 220 over the external processor link 240, the process 500 continues back to block 521. If, at block 535, one or more messages are from the external device 220, then the counter 311 increments by the number of messages (or bytes) that are received (block 537). From block 537, the process 500 continues at block 539.

At block 539 if the end of the current time interval has not been reached, the process 500 continues back to block 533; thus, blocks 533-539 repeat until the end of the current time interval. By repeating blocks 533-539, the traffic controller 212 monitors the number of messages received from the untrusted external device 220 for the current time interval. At the end of the time interval, as indicated by the timer 313, the process 500 continues from block 539 to block 541.

At block 541, various components of the traffic controller 212 update their calculations for the recently elapsed time interval. For example, adder logic 321 calculates the sum or the average number of messages from the untrusted external device 220 over the window of N most recent time intervals. Other calculations are also performed for each elapsed time interval, depending on the throttling method being used; for example, the final count value for the interval is stored in one of the registers 312, the sum or average of the count values for the N time intervals is calculated in the adder logic 321, remaining debt and remaining throttle time for a past violation are calculated, etc. From block 541, the process 500 continues at block 543.

At block 543, the comparison logic 324 detects whether a violation of the traffic policy has occurred based on the calculated sum or average of the count values for the N intervals. The comparison logic 324 compares the sum or average to a maximum threshold corresponding to the elapsed time interval, as provided by the configuration register 322. If the maximum threshold is exceeded, a violation of the traffic policy has occurred, and the process 500 continues at block 545.

At block 545, the traffic controller 212 responds to the violation by beginning throttling of the traffic from the untrusted external device 220. The throttling reduces traffic in the NoC 213 due to messages from the untrusted external device 220 for a predetermined time period (e.g., M intervals). The specific actions performed by the throttle logic 330 depend on the throttling mechanism being used; in one embodiment, the throttling mechanism is specified in the configuration register 322. One throttling mechanism, as previously described, reduces the maximum threshold for the next subsequent time interval by an amount corresponding to a difference between the number of messages (or bytes) counted for the interval and the maximum threshold for the time interval. According to this scheme, the throttle logic 330 decrements the counter 311 by the threshold amount instead of resetting the counter 311 to zero. Another throttling mechanism previously described is a debt accrual and payback mechanism. According to this scheme, the throttle logic 330 at block 545 begins accruing and reducing debt in response to traffic policy violations and elapsed time, respectively. In alternative configurations and embodiments, other actions for reducing the traffic in the NoC 213 due to messages from the external device 220 are performed at block 545.

At block 543, if the maximum threshold for the most recently elapsed time interval has not been exceeded, the process 500 continues at block 547. At block 547, the throttle logic evaluates any of a number of conditions (depending on the throttling mechanism used) to determine whether or not to end the throttling. For example, when implementing a throttling method that restricts traffic from the external device 220 for M time intervals after a traffic policy violation has occurred, the throttle logic 330 ends throttling if the M intervals have elapsed. When implementing a throttling method that includes a debt accrual and payback mechanism, the throttle logic 330 ends throttling if the debt associated with the external device 220 has been repaid. Accordingly, for other throttling methods, the throttling is ended based on other criteria.

If the criteria for ending throttling are not met, the throttling is continued at block 545. From block 545, the process 500 further continues at block 501, where the transmitting of local traffic and traffic from the external device 220 continues with throttling in effect. If the criteria are met at block 547, the throttling is ended at block 549, and the process 500 further continues at block 501, where the transmitting of local traffic and traffic from the external device 220 continues without throttling of the external device 220.

Thus, the process 500 loops through blocks 501, 511, 521, and 523 when the local traffic is low (i.e., below the local traffic threshold) to service the local traffic and external traffic from the untrusted external device 220 without monitoring and throttling of the external traffic. When local traffic is high (i.e., above the local traffic threshold), the process 500 loops through blocks 501, 511, 521, and 531-549 to monitor external traffic from the external device 220 over a set of one or more time intervals, and reduce traffic in the NoC 213 in response to detecting a violation of traffic policy by the external traffic.

Thus, a processing unit as described above includes a host system-on-chip (SoC) that includes a network on chip (NoC) that is configured to transmit local traffic between internal blocks of the SoC, an external processor link configured to receive messages at the host SoC from an untrusted device, and a traffic controller connected to the external processor link. The traffic controller is configured to monitor an amount of external traffic from the untrusted device over a set of time intervals, detect a violation of a traffic policy based on the amount of external traffic, and in response to detecting the violation, reduce traffic in the NoC resulting from the messages from the untrusted device.

In particular, the traffic controller detects the violation of the traffic policy by determining whether the number of messages transmitted to the host SoC from the untrusted device during a given time interval exceeds a maximum threshold for the time interval. The traffic controller includes a message counter that increments in response to each message that is received from the untrusted device via the external processor link, and resets in response to elapsing of the given time interval.

The traffic controller additionally includes configuration logic that can receive a request to change the maximum threshold. The configuration logic changes the maximum threshold according to the request in response to authenticating the request, or ignores the request in response to failing to authenticate the request.

The traffic controller is additionally configured to, in response to determining that the number of messages transmitted to the host SoC from the untrusted device exceeds the maximum threshold for a given time interval, reduce a maximum threshold for a subsequent time interval. The traffic controller reduces the maximum threshold for the subsequent time interval by an amount corresponding to a difference between the number of messages received during the given time interval and the maximum threshold for the given time interval.

The traffic controller detects the violation of the traffic policy by calculating an average number of messages from the untrusted device over a window of N most recent time intervals and determining that the average number exceeds a maximum threshold.

The traffic controller additionally includes multiple registers in a shift buffer. Each of the registers stores a number of messages for one of the N most recent time intervals that is associated with the register. The traffic controller also includes an adder to sum the stored numbers in the registers.

The traffic controller includes a first register that stores a time-weighted sum of a number of messages detected for each of N−1 prior time intervals of the N most recent time intervals, and a second register that stores a number of messages detected for a most recent of the N most recent time intervals. The traffic controller also includes logic to calculate a new time-weighted sum by adding the number in the second register to a bit-shifted version of the time-weighted sum in the first register.

The traffic controller also includes throttle logic that reduces the traffic in the NoC by restricting traffic from the untrusted device for a predetermined time period.

The traffic controller also includes a local traffic monitor that determines whether the local traffic exceeds a local traffic threshold. The traffic controller reduces the traffic in the NoC in response to detecting the violation when the local traffic exceeds the local traffic threshold.

A method for throttling traffic from an untrusted device includes transmitting local traffic between internal blocks of a host system-on-chip (SoC) via a network on chip (NoC) in the host SoC, receiving messages at the host SoC from the untrusted device via an external processor link, monitoring an amount of external traffic from the untrusted device over a set of one or more time intervals, detecting a violation of a traffic policy based on the amount of external traffic, and in response to detecting the violation, reducing traffic in the NoC resulting from the messages from the untrusted device.

Detecting the violation of the traffic policy additionally includes determining whether a number of messages transmitted to the host SoC from the untrusted device during a given time interval of the set of time intervals exceeds a maximum threshold for the time interval.

The method for throttling traffic from the untrusted device additionally includes receiving from an external device a request to change the maximum threshold, changing the maximum threshold according to the request in response to authenticating the request, and ignoring the request in response to failing to authenticate the request.

The method additionally includes, in response to determining that the number of messages transmitted to the host SoC from the untrusted device exceeds the maximum threshold for the given time interval, reducing a maximum threshold for a subsequent time interval by an amount corresponding to a difference between the number of messages and the maximum threshold for the time interval.

Detecting the violation of the traffic policy includes calculating an average number of messages from the untrusted device over a window of N most recent time intervals of the set of time intervals, and determining that the average number exceeds a maximum threshold.

The method for throttling traffic from the untrusted device additionally includes reducing the traffic in the NoC by restricting traffic from the untrusted device for a predetermined time period.

The method additionally includes determining whether the local traffic exceeds a local traffic threshold, and reducing the traffic in the NoC in response to detecting the violation when the local traffic exceeds the local traffic threshold.

A computer system that includes an untrusted device additionally includes a memory, a host system-on-chip (SoC) connected to the memory and connected to the untrusted device via an external processor link, which receives messages at the host SoC from the untrusted device. The host SoC transmits data from the memory to the untrusted device in response to messages from the untrusted device. The host SoC additionally includes a network on chip (NoC) configured to transmit local traffic between internal blocks of the SoC, and a traffic controller coupled with the external processor link.

The traffic controller monitors the amount of external traffic from the untrusted device over a set of one or more time intervals, detects a violation of a traffic policy based on the amount of external traffic, and in response to detecting the violation, reduces traffic in the NoC resulting from the messages from the untrusted device. The traffic controller is located on a single integrated circuit chip with the host SoC.

The external processor link additionally includes flow control logic that regulates the traffic from the untrusted device based on a buffer capacity of the external processor link.

The messages from the untrusted device include read requests, write requests, and address translation requests directed to the memory.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the host SoC 210 and/or portions thereof carried on the computer-readable storage medium may be a database or other data structure which can be read by a program and used, directly or indirectly, to fabricate the hardware comprising the host SoC 210. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the host SoC 210. The netlist may then be placed and routed to produce a data set describing geometric shapes to be applied to masks. The masks may then be used in various semiconductor fabrication steps to produce a semiconductor circuit or circuits corresponding to the host SoC 210. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

What is claimed is:

1. An apparatus, comprising:
   a host system-on-chip (SoC) comprising a network on chip (NoC) configured to transmit local traffic between internal blocks of the SoC;
   an external processor link configured to receive messages at the host SoC from an untrusted device, wherein the received messages comprise one or more memory access requests directed to a memory of the host SoC;
   a traffic controller coupled with the external processor link and configured to:
      monitor an amount of external traffic from the untrusted device transmitted over the NoC over a set of one or more time intervals,
      detect a violation of a traffic policy based on the amount of external traffic by determining whether a number of messages transmitted to the host SoC from the untrusted device during a first time interval of the set of time intervals exceeds a maximum threshold for the first time interval, and
      in response to detecting the violation, reduce traffic in the NoC resulting from the messages from the untrusted device.

2. The apparatus of claim 1, wherein the traffic controller comprises a message counter configured to:
   increment in response to each message from the untrusted device received at the external processor link, and
   reset in response to elapsing of the first time interval.

3. The apparatus of claim 1, wherein the traffic controller further comprises configuration logic configured to:
receive a request to change the maximum threshold,
change the maximum threshold according to the request in response to authenticating the request, and
ignore the request in response to failing to authenticate the request.

4. The apparatus of claim 1, wherein the traffic controller is further configured to, in response to determining that the number of messages transmitted to the host SoC from the untrusted device exceeds the maximum threshold for the first time interval, reduce a maximum threshold for a subsequent time interval by an amount corresponding to a difference between the number of messages and the maximum threshold for the first time interval.

5. The apparatus of claim 1, wherein the traffic controller is configured to detect the violation of the traffic policy by calculating an average number of messages from the untrusted device over a window of N most recent time intervals of the set of time intervals, and determining that the average number exceeds a maximum threshold.

6. The apparatus of claim 5, wherein the traffic controller comprises:
a plurality of registers in a shift buffer, wherein each register of the plurality of registers is configured to store a number of messages for one of the N most recent time intervals that is associated with the register, and
an adder configured to sum the stored numbers in the plurality of registers.

7. The apparatus of claim 5, wherein the traffic controller comprises:
a first register configured to store a time-weighted sum of a number of messages detected for each of N−1 prior time intervals of the N most recent time intervals;
a second register configured to store a number of messages detected for a most recent time interval of the N most recent time intervals; and
logic configured to calculate a new time-weighted sum by adding the number in the second register to a bit-shifted version of the time-weighted sum in the first register.

8. The apparatus of claim 1, wherein the traffic controller further comprises throttle logic configured to reduce the traffic in the NoC by restricting traffic from the untrusted device for a predetermined time period.

9. The apparatus of claim 1, wherein:
the traffic controller further comprises a local traffic monitor configured to determine whether the local traffic exceeds a local traffic threshold, and
the traffic controller is further configured to reduce the traffic in the NoC in response to detecting the violation when the local traffic exceeds the local traffic threshold.

10. A method, comprising:
transmitting local traffic between internal blocks of a host system-on-chip (SoC) via a network on chip (NoC) in the host SoC;
receiving messages at the host SoC from an untrusted device via an external processor link, wherein the received messages comprise one or more memory access requests directed to a memory of the host SoC;
monitoring an amount of external traffic from the untrusted device transmitted over the NoC over a set of one or more time intervals;
detecting a violation of a traffic policy based on the amount of external traffic by determining whether a number of messages transmitted to the host SoC from the untrusted device during a first time interval of the set of time intervals exceeds a maximum threshold for the first time interval; and
in response to detecting the violation, reducing traffic in the NoC resulting from the messages from the untrusted device.

11. The method of claim 10, further comprising:
receiving from an external device a request to change the maximum threshold,
changing the maximum threshold according to the request in response to authenticating the request, and
ignoring the request in response to failing to authenticate the request.

12. The method of claim 10, further comprising, in response to determining that the number of messages transmitted to the host SoC from the untrusted device exceeds the maximum threshold for the first time interval, reduce a maximum threshold for a subsequent time interval by an amount corresponding to a difference between the number of messages and the maximum threshold for the first time interval.

13. The method of claim 10, wherein detecting the violation of the traffic policy comprises:
calculating an average number of messages from the untrusted device over a window of N most recent time intervals of the set of time intervals; and
determining that the average number exceeds a maximum threshold.

14. The method of claim 13, further comprising reducing the traffic in the NoC by restricting traffic from the untrusted device for a predetermined time period.

15. The method of claim 10, further comprising:
determining whether the local traffic exceeds a local traffic threshold; and
reducing the traffic in the NoC in response to detecting the violation when the local traffic exceeds the local traffic threshold.

16. A system, comprising:
an untrusted device;
a memory;
a host system-on-chip (SoC) coupled with the memory and coupled with the untrusted device via an external processor link, wherein the external processor link is configured to receive messages at the host SoC from the untrusted device, wherein the received messages comprise one or more memory access requests directed to the memory, and wherein the host SoC is configured to transmit data from the memory to the untrusted device in response to messages from the untrusted device, the host SoC further comprising:
a network on chip (NoC) configured to transmit local traffic between internal blocks of the SoC; and
a traffic controller coupled with the external processor link and configured to:
monitor an amount of external traffic from the untrusted device transmitted over the NoC over a set of one or more time intervals,
detect a violation of a traffic policy based on the amount of external traffic by determining whether a number of messages transmitted to the host SoC from the untrusted device during a first time interval of the set of time intervals exceeds a maximum threshold for the first time interval, and
in response to detecting the violation, reduce traffic in the NoC resulting from the messages from the untrusted device.

17. The system of claim 16, wherein the external processor link further comprises flow control logic configured to regulate the traffic from the untrusted device based on a buffer capacity of the external processor link.

18. The system of claim 16, wherein the traffic controller is located on a single integrated circuit chip with the host SoC.

19. The system of claim 16, wherein the messages from the untrusted device include read requests, write requests, and address translation requests directed to the memory.

* * * * *